United States Patent [19]

Ehrentraut et al.

[11] Patent Number: 4,606,653

[45] Date of Patent: Aug. 19, 1986

[54] HIGH-DUTY SLIDING SURFACE BEARING

[75] Inventors: Otto Ehrentraut, Gmunden; Ulf G. Ederer, Laakirchen, both of Austria

[73] Assignee: Miba Gleitlager Aktiengesellschaft, Laakirchen, Austria

[21] Appl. No.: 702,364

[22] Filed: Feb. 15, 1985

[30] Foreign Application Priority Data

Feb. 27, 1984 [AT] Austria .................. 627/84

[51] Int. Cl.$^4$ ........................... F16C 33/24
[52] U.S. Cl. .................... 384/283; 384/276
[58] Field of Search ............... 384/129, 276, 282–285, 384/280, 291–293

[56] References Cited

U.S. PATENT DOCUMENTS

| 1,331,961 | 2/1920 | Klocke | 384/276 |
| 1,460,515 | 7/1923 | Selker | 384/276 |
| 1,732,273 | 10/1929 | Landon | 384/276 |
| 4,400,099 | 8/1983 | Ehrentraut | 384/283 |

FOREIGN PATENT DOCUMENTS

| 369145 | 4/1982 | Austria . | |
| 1286827 | 1/1969 | Fed. Rep. of Germany | 384/276 |
| 637278 | 3/1962 | Italy | 384/276 |
| 718073 | 11/1954 | United Kingdom | 384/283 |
| 1166271 | 10/1969 | United Kingdom | 384/276 |

Primary Examiner—Stuart S. Levy
Assistant Examiner—Thomas Hannon
Attorney, Agent, or Firm—Kurt Kelman

[57] ABSTRACT

In a sliding surface layer, a bearing metal layer is provided on the inside surface of a backing shell and is formed on its inside surface with elongate recesses, which extend in the peripheral direction of the bearing and are distributed over the axial extent of the sliding surface of the bearings. These elongate recesses contain a relatively soft bearing material. In order to increase the fatigue limit and the wear resistance, the softer bearing material constitutes a continuous covering layer, which has on the lands of the inside surface of the bearing metal layer a thickness that is not in excess of 1.5 times the depth of the elongate recesses. The axial center spacing of the elongate recesses should not exceed an upper limit $a_o = 500 + 0.5\,d + 0.01\,d^2$ in micrometers, if d is the bearing diameter in micrometers.

3 Claims, 1 Drawing Figure

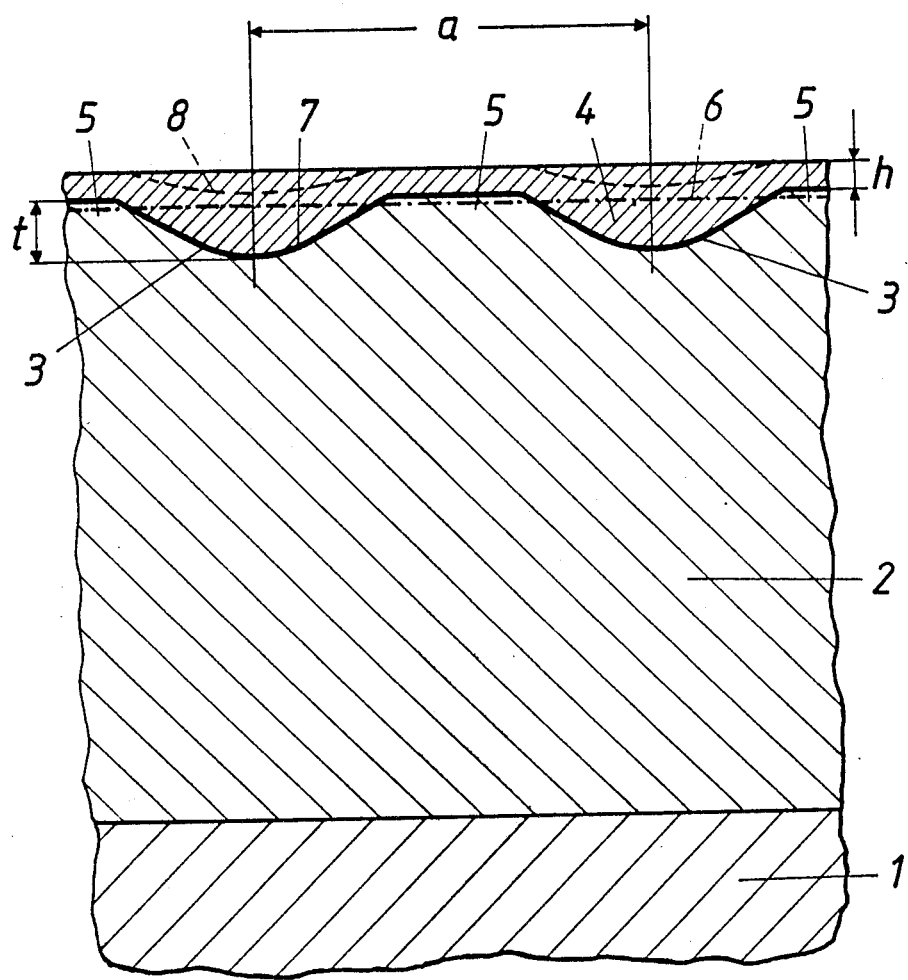

HIGH-DUTY SLIDING SURFACE BEARING

BACKGROUND OF THE INVENTION

1. Field of the Invention

This invention relates to a high-duty sliding surface bearing comprising a load-carrying backing shell and a bearing metal layer applied to the backing shell and formed with elongate recesses which extend at least substantially in the peripheral direction, are distributed over the axial extent of the bearing surface and have an axial center spacing not in excess of 10 mm, and a softer bearing material.

2. Description of the Prior Art

In order to provide a sliding surface bearing in which the advantage afforded by a relatively hard bearing material and the use of a relatively soft bearing material are combined whereas the disadvantages involved in the use of each of said materials are avoided, it is known from Austrian Pat. No. 369,145 to embed the softer bearing material in elongate recesses formed in the harder bearing metal layer and extending at least substantially in the peripheral direction. Because the spacing of the elongate recesses is limited, a fine distribution of the harder and softer bearing materials over the axial extent of the sliding surface is obtained so that, even in a local area subjected to a load, the two bearing materials will become effective only in combination rather than individually and the disadvantages involved in the use of each bearing material are substantially eliminated. In such a bearing, the bearing metal layer consisting of a relatively hard material has a supporting function, which involves a relative relief of the softer material, and this has the result that the fatigue limit and the wear resistance of the sliding surface are increased. Bearings of the kind are substantially similar in their behavior to bearings having a continuous sliding surface consisting of a relatively soft bearing material but have a higher wear resistance. But these bearings are not equally well suited for all applications because the harder bearing metal layer may not always be capable of an adequate adaptation to excessive deformation under severe conditions. Where such an adaptation is required, e.g., as the bearing is run in, it will be necessary to use conventional bearings having a relatively soft bearing metal layer although the latter is not satisfactory as regards fatigue limit and wear resistance.

SUMMARY OF THE INVENTION

For this reason it is an object of the invention to improve a high-duty sliding surface bearing which is of the kind described first hereinbefore that it has a high fatigue limit and a high wear resistance yet is highly adaptable to relatively large deformations.

This object is accomplished in accordance with the invention in that the softer bearing material constitutes a wearing layer, which continuously covers the bearing metal layer in a thickness of up to 1.5 times the depth of the elongate recesses and that the axial center spacing of the recesses is not in excess of an upper limit $$a_o = 500 = 0.5d + 0.01d^2$$

in micrometers, where $d$ is the diameter of the bearing in millimeters.

Because the bearing metal layer is continuously covered by the softer bearing material, an adaptation to relatively large deformations will be permitted by a continuous sliding surface layer which consists of a relatively soft bearing material so that the properties of the sliding surface bearing in the running-in period will be improved. In spite of the presence of a continuous sliding surface layer consisting of a relatively soft bearing material, the desired properties as regards fatigue limit and wear resistance will be achieved because the thickness of the covering layer on the bearing metal layer does not exceed an upper limit so that the harder bearing metal layer will become effective and ensure a high wear resistance when the softer bearing material has been worn away above the bearing metal.

The wear is highest as the bearing is run in and the action of the softer bearing material layer covering the bearing metal layer predominates as the bearing is run in. For this reason there is no need to provide the harder and softer bearing materials in a particularly fine distribution over the axial extent of the sliding surface in order to avoid local overloads which could be due to an inadequate adaptation to necessary deformation but the axial spacing of the elongate recesses may even be larger than in the prior art.

To ensure that the harder bearing metal layer will become effective during the life of a bearing, the covering layer of the softer bearing material must be worn away at least in part. If the permissible clearance is not taken into account, the largest permissible wear will be determined by the depth of the elongate recesses, because the softer bearing material will no longer be available when such wear has occurred. For this reason the maximum thickness of the covering layer consisting of the soft bearing material should be selected in consideration of the depth of the elongate recesses and in consideration of the lower wear resistance of that softer bearing material and the thickness of the covering layer consisting of the softer bearing material should not exceed 1.5 times the depth of the recesses.

Desirable conditions will generally be obtained if the covering layer consisting of the softer bearing material has a thickness which is not in excess of the depth of the elongate recesses and preferably amounts to 0.3 to 0.7 time said depth. In that case the fine distribution of harder and softer zones of the sliding surface, which distribution ensures a high fatigue limit and a high wear resistance in conjunction with good running properties, will be obtained immediately after the bearing has been run in so that the wear of the softer covering layer will not result in an excessive increase of the bearing clearance.

BRIEF DESCRIPTION OF THE DRAWING

The drawing is a diagrammatic transverse sectional view showing a sliding surface bearing which embodies the invention.

DETAILED DESCRIPTION OF THE PREFERRED EMBODIMENT

An illustrative embodiment of the invention is shown on the drawing. The sliding surface bearing shown there comprises a backing shell 1 of steel and a bearing metal layer 2 consisting of aluminum or copper and applied to the backing shell 1. The bearing metal layer 2 is formed in its inside surface with elongate recesses 3, which are filled with a softer bearing material 4, such as a white metal alloy. The arrangement is such that the softer bearing material 4 does not only fill the recesses 3 but covers also the lands 5 left between the recesses so that the softer bearing material 4 constitutes a continuous sliding surface layer. This sliding surface layer is well adaptable in a desirable manner even to relatively large deformations, e.g., as the bearing is run in. The resulting wear will cause part of the softer bearing material 4 to be removed so that the relatively hard bearing metal layer 2 will then become effective and owing to its higher wear resistance will present a considerable resistance to a continued wear. It will be realized that such a sliding surface bearing combines excellent running-in properties with a high fatigue limit and a high wear resistance. Because the softer bearing material 4 which covers the bearing metal layer 2 usually does not wear evenly, the harder bearing metal layer 2 will initially become effective only in local areas and the resulting improved supporting action will relieve those portions of the sliding surface on which the bearing metal layer 2 is still covered by the softer bearing material 4. As a result, an adequate sliding surface formed by the relatively soft bearing material 4 will be available even in case of subsequent dislocations, which may be due to a distortion of the housing or to the installation and removal of the bearing. This continued presence of the softer bearing material 4 will greatly facilitate the adaptation to different conditions. To ensure that the harder bearing metal layer 2 will become effective in local areas, the thickness $h$ in which the softer bearing material 4 covers the lands 5 between the recesses 3 must not exceed an upper limit. In that case, the sliding surface obtained after a certain wear will consist of zones of hard and soft materials in alternation. This result will be obtained, e.g., when material has been removed as far as to the phantom line 6. It will be understood that the actions of the softer bearing material 4 and the harder bearing metal layer 2 will be combined only in a depth portion corresponding to the depth $t$ of the recesses 3 and that depth $t$ will usually determine the life of the bearing if the increase in diameter accompanying the wear as far as to the depth $t$ is not taken into account. For this reason the thickness of the covering layer over the lands 5 should be related to the depth $t$ of th recesses when the bearing is new. That thickness $h$ will be selected in dependence on the conditions to be expected and has an upper limit $h = 1.5\ t$. A desirable thickness $h$ of the covering layer usually lies in the range from 0.3 to 0.7 t.

The axial center spacing $a$ of the recesses 3 will determine how the softer bearing material 4 is distributed in the harder bearing metal layer 2 over the axial extent of the sliding surface. In known bearings in which the lands between the recesses are not covered by the softer bearing material 4 that center spacing $a$ is relatively small so that the fine distribution of soft and hard materials will ensure a combined action also in local areas. This will be of special importance as the bearing is run in because the danger of local overloads will be greatest in that period. In the sliding surface bearing in accordance with the invention the running-in operation is less critical because the softer bearing material 4 provides a continuous wearing layer so that a larger center spacing $a$ might be slected under certain circumstances. Because the wear is higher as the bearing is run in, the depth $t$ of the recesses may be smaller since the continuous wearing layerr consisting of the soft bearing material 4 will be worn off as the bearing is run in.

The continuous covering or wearing layer which is provided on the bearing metal layer 2 and consists of the softer bearing material ensures that the bearing will operate under favorable conditions, particularly as the bearing is run in, and the possibility of a formation of cracks adjacent to the land will not involve undesirable rsults.

It is quite conventional to provide a barrier layer, e.g., of nickel, between a relatively soft bearing material and a harder bearing metal and such bearing layer 7 may also be provided in a bearin according to the invention. In special cases the continuous layer of the soft bearing material 4 covering the bearing metal layer may be shaped in adaptation to the recesses 3, as is indicated by the dotted line 8.

We claim:
1. A high-duty sliding surface bearing comprising
   (a) a backing shell having an inside surface,
   (b) an annular bearing metal layer on the inside surface of the shell, the bearing metal layer having an inside surface formed with axially spaced, generally peripherally extending elongate recesses and with lands between the recesses, the recesses being distributed over the axial extent of the inside surface of the bearing metal layer and having an axial center spacing not in excess of 10 millimeters, the axial center spacing not exceeding an upper limit

$$a_o = 500 + 0.5d + 0.01d^2$$

in micrometers, wherein $d$ is the inside diameter of the bearing in millimeters, and
   (c) a bearing material which is softer than the bearing metal of said layer filling the recesses and forming a covering layer over the inside surface of the bearing metal layer including said lands, the covering layer having a thickness not exceeding 1.5 times the depth of the elongate recesses.
2. The bearing set forth in claim 1, wherein the thickness of said covering layer over said lands is not in excess of the depth of said elongate recesses.
3. The bearing set forth in claim 1, wherein the thickness of said covering layer over said lands is between 0.3 time and 0.7 time the depth of said elongate recesses.

* * * * *